W. J. EHLERT.
FERTILIZER DISTRIBUTER.
APPLICATION FILED JUNE 3, 1911.

1,065,034.

Patented June 17, 1913.

2 SHEETS—SHEET 1.

W. J. EHLERT.
FERTILIZER DISTRIBUTER.
APPLICATION FILED JUNE 3, 1911.

1,065,034.

Patented June 17, 1913.

2 SHEETS—SHEET 2.

Witnesses
S. J. Lockwood
Geo. A. Hamlin

Inventor
William J. Ehlert
by Henry N. Copp
his Attorney

COLUMBIA PLANOGRAPH CO., WASHINGTON, D. C.

UNITED STATES PATENT OFFICE.

WILLIAM J. EHLERT, OF HUNTLEY, ILLINOIS.

FERTILIZER-DISTRIBUTER.

1,065,034.  Specification of Letters Patent.  Patented June 17, 1913.

Application filed June 3, 1911. Serial No. 631,159.

*To all whom it may concern:*

Be it known that I, WILLIAM J. EHLERT, a citizen of the United States, residing at Huntley, county of McHenry, and State of Illinois, have invented certain new and useful Improvements in Fertilizer-Distributers, of which the following is a specification.

This invention relates to fertilizer distributers.

The object of the present invention is the provision of an improved traveling slatted apron and operating means therefor for fertilizer distributers of the type employing a traveling apron.

The invention consists in those features of construction set forth in the appended claim.

Figure 1:
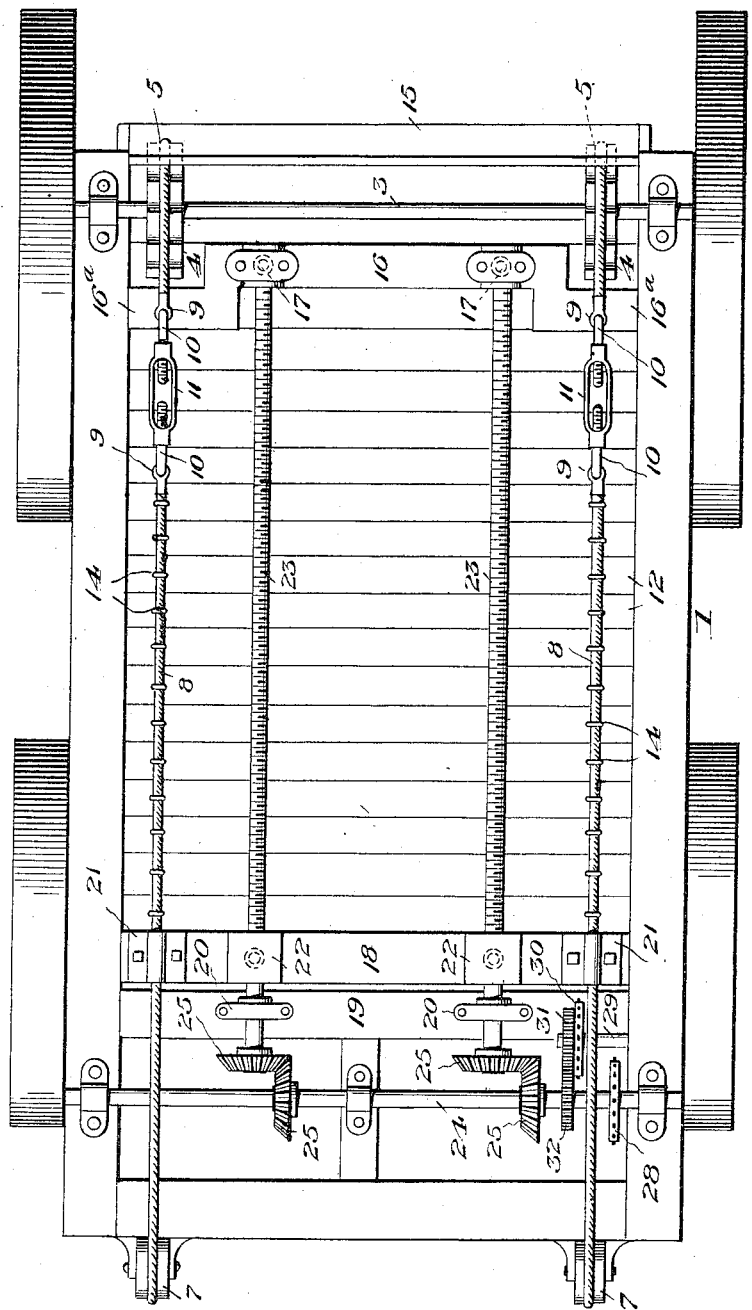
Figure 2:
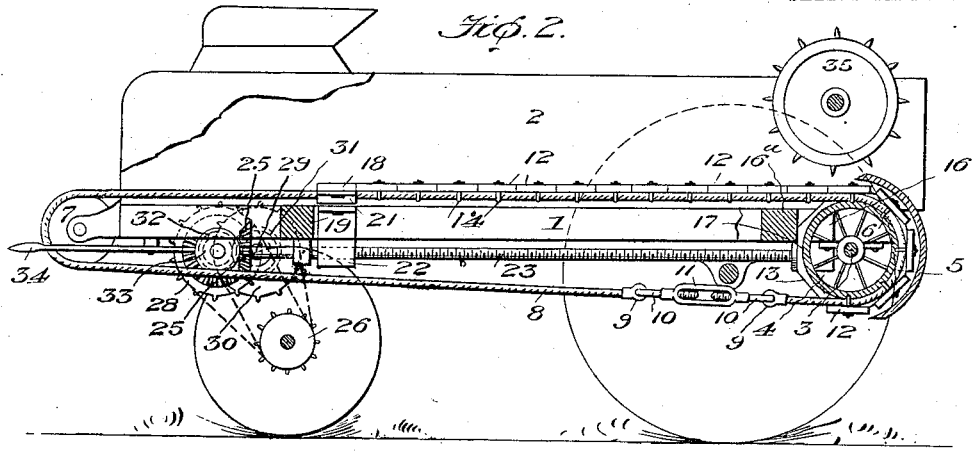
Figure 3:
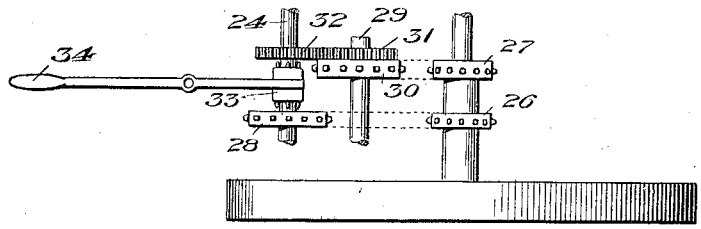
Figure 4:
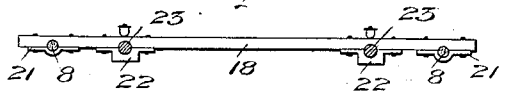
Figure 5:
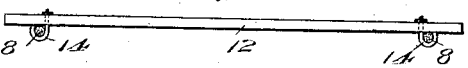
Figure 6:
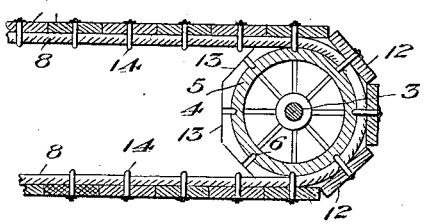
Figure 7:
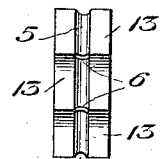

In the accompanying drawings: Figure 1, a longitudinal section; Fig. 2, a detail of controlling gearing which may be used; Fig. 3, a detail of the operating slat; Fig. 4, a detail of one of the slats of the apron; Fig. 5, an enlarged detail showing how the slats pass around the wheels; and Fig. 6, a face view of the wheels shown in Fig. 5.

The frame 1 may be suitably supported on the running gear of a wagon and provided with sides 2 to confine the fertilizer. Extending crosswise of the frame is a shaft 3 which carries polygonal wheels 4 each having a circumferential groove or channel 5 in which are notches 6 arranged at intervals. Preferably two of the wheels 4 are carried by the shaft 3 which is located at the rear of the frame 1. At the front of said frame are idlers or sheaves 7. Extending around the idlers 7 and the wheels 4 and running in the grooves 5 of the latter, are cables 8 which are provided with eyes 9 at a certain point thereof, said eyes being connected by the hooks 10 or screws forming part of a turnbuckle 11 by which the tension of the cables 8 may be adjusted so that said cables may be made properly taut to hold the apron slats 12 in properly tensioned condition.

The slats 12 extend crosswise of the frame between the side boards 2 and said slats are of a width substantially corresponding to the length of the sides 13 of the wheels 4 so that they will lie flat thereagainst as they pass around the said wheels during the feed of the apron. The cables 8 are secured to the slats by screw hooks 14.

Secured to the frame 1 is a flat metal or rigid bar 16 which is provided with bearings or boxes 17 preferably provided with grease cups. In order to enable the apron to carry off all of the fertilizer, the bar 16 is provided with the off-set end parts 16ª, as will presently more fully appear. Extending across and secured to the frame 1 is a bar 19 which is provided with bearings 20. The end slat 18 is of metal, being provided with clamps 21 which connect it to the cables 8. This slat is provided with internally screw-threaded boxes 22 which are preferably provided with grease cups.

Journaled in the boxes 17 and 20 so as to be incapable of longitudinal movement, are the screw-threaded feed shafts 23 which extend lengthwise of the machine in substantially parallel arrangement. The shafts 23 are engaged with the boxes 22 so that when said shafts are turned in one direction, the slat 18 and the entire apron will be moved in one direction, and when said screws are turned in the opposite direction, the apron will be turned to normal position.

Journaled in the boxes on frame 1 is the operating shaft 24 which is connected by bevel gears 25 to the respective shafts 23. Any suitable operating mechanism may be employed for driving the shaft 24 in either direction from a wheel of the vehicle, subject to control by the driver. For instance, separate sprocket wheels 26 and 27 may be provided on one of the ground wheels, one of which will be connected to a sprocket wheel 28 loose on the shaft 24, and on a separate shaft 29 there is a sprocket wheel 30 having a gear 31 adapted to mesh with a gear 32 on shaft 24. A double clutch 33 operated by a lever 34 is used for throwing one or the other of the wheels 28 and 32 in operative connection with the shaft 24. The spreader 35 may be suitably mounted and driven so that it will be adapted to throw off the fertilizer from the apron above the shield 15.

When the apron is in the position shown in Fig. 1, it forms a bottom on which the load of fertilizer may be placed. The shaft 24 is then thrown into operation, whereupon the turning of the screws 23 positively draw back or retreat the apron and its load toward the rear of the machine, that is, toward the spreader 35 and the latter throws off the fertilizer. The slat 18 finally comes against the bar 16 and by reason of the off-set arrangement of said bar, the slat 18 can travel entirely to the rear of the machine and thus bring the last part of the load of fertilizer underneath and subject to the action of the spreader 35. When the load has been completely spread, the rotation of the shaft 24 is reversed by shifting the clutches and the continued advance of the vehicle will then draw the apron back to initial position to permit another load to be received on said apron.

Any suitable means may be employed to permit stoppage of the shaft 24 at the limits of the movement of the apron so as to prevent any breakage of the parts.

Having thus described my invention, what I claim as new, and desire to secure by Letters Patent, is:—

In a fertilizer distributer, a traveling slatted apron having only a single stretch, flexible endless cables, hook-shaped bolts connecting each and every slat of the apron independently to the upper stretches of said cables, the lower stretches of the cables being entirely disconnected from the slats, and grooved wheels over which the slats pass, said wheels being provided with transverse notches to receive the hooked parts of the bolts, the grooves in the wheels receiving the cables aforesaid.

In testimony whereof, I hereunto affix my signature in presence of two witnesses.

WILLIAM J. EHLERT.

Witnesses:
   CHRIS. AHERNS,
   FRANK McNEENEY.

Copies of this patent may be obtained for five cents each, by addressing the "Commissioner of Patents, Washington, D. C."